(12) United States Patent
Surasathian

(10) Patent No.: US 9,049,227 B2
(45) Date of Patent: Jun. 2, 2015

(54) SYSTEM AND METHOD FOR ADAPTING AN INTERNET AND INTRANET FILTERING SYSTEM

(76) Inventor: Janet Surasathian, Zetland (AU)

( * ) Notice: Subject to any disclaimer, the term of this patent is extended or adjusted under 35 U.S.C. 154(b) by 575 days.

(21) Appl. No.: 13/132,607

(22) PCT Filed: Dec. 7, 2009

(86) PCT No.: PCT/AU2009/001590
§ 371 (c)(1),
(2), (4) Date: Jun. 2, 2011

(87) PCT Pub. No.: WO2010/065991
PCT Pub. Date: Jun. 17, 2010

(65) Prior Publication Data
US 2011/0247073 A1   Oct. 6, 2011

(30) Foreign Application Priority Data

Dec. 8, 2008   (AU) ................................ 2008906320

(51) Int. Cl.
*G08B 23/00*       (2006.01)
*H04L 29/06*       (2006.01)
(Continued)

(52) U.S. Cl.
CPC .......... *H04L 63/145* (2013.01); *H04L 63/1416* (2013.01); *H04L 12/2618* (2013.01); *G06F 21/554* (2013.01); *G06F 2221/2149* (2013.01); *H04L 63/0227* (2013.01)

(58) Field of Classification Search
CPC ..... H04L 63/00; H04L 63/0218; H04L 63/14; H04L 63/1408; H04L 63/1416; H04L 63/30; H04L 12/2602; H04L 12/2615; H04L 12/2618; H04L 12/2634

USPC .......... 726/4, 11, 13, 22, 26–27, 30; 713/188; 709/224–225, 246
See application file for complete search history.

(56) References Cited

U.S. PATENT DOCUMENTS 5,706,507 A * 1/1998 Schloss ......................... 709/225
5,832,212 A * 11/1998 Cragun et al. ..................... 726/2
(Continued)

FOREIGN PATENT DOCUMENTS

EP           1615379 A1 * 1/2006

*Primary Examiner* — Saleh Najjar
*Assistant Examiner* — Eric W Shepperd

(57) ABSTRACT

According to the present invention, there is provided a system and method for continuously interfacing with a plurality of computer based event monitoring systems such as Internet and Intranet filtering systems and or virus scanning software to determine whether these systems have detected a non-threatening and or security threatening event that corresponds with an event pre-determined and recorded within the events list which contains a plurality of non-threatening and security threatening events that may occur within a computer which in turn triggers a classified, targeted and value-adding hypertext message or information to be instantly displayed to the computer user through a browser or user interface instead of an event monitoring system default hypertext security message, and preferably an editing function shall be provided that enables the login of authorized authors including computer administrator/s to edit and publish targeted and value-adding hypertext messages and information, and preferably a measuring function shall be provided that enables the login of authorized authors including computer administrator/s to define and set up a plurality of metrics that may enable them to measure the effectiveness of the displayed targeted and value-adding hypertext messages and information in terms of being useful, entertaining, educational, interesting or instructional to a computer user through an alternate browser or user interface at the unique point in time when their computer has detected an event.

13 Claims, 1 Drawing Sheet

(51) Int. Cl.
*G06F 21/55* (2013.01)
*H04L 12/26* (2006.01)

(56) References Cited

U.S. PATENT DOCUMENTS

| | | | | |
|---|---|---|---|---|
| 6,065,056 | A * | 5/2000 | Bradshaw et al. | 709/229 |
| 6,202,087 | B1 * | 3/2001 | Gadish | 709/206 |
| 6,209,027 | B1 * | 3/2001 | Gibson | 709/218 |
| 6,976,070 | B1 * | 12/2005 | Hoashi et al. | 709/224 |
| 7,383,282 | B2 * | 6/2008 | Whitehead et al. | 707/700 |
| 7,509,148 | B1 * | 3/2009 | Pisutha-Arnond et al. | 455/567 |
| 7,685,269 | B1 * | 3/2010 | Thrasher et al. | 709/224 |
| 7,912,900 | B1 * | 3/2011 | Lippert et al. | 709/204 |
| 8,146,146 | B1 * | 3/2012 | Coviello et al. | 726/11 |
| 8,224,950 | B2 * | 7/2012 | Humes | 709/224 |
| 8,473,552 | B1 * | 6/2013 | Marks | 709/206 |
| 8,516,536 | B2 * | 8/2013 | Chin et al. | 725/142 |
| 2002/0143827 | A1 * | 10/2002 | Crandall | 707/530 |
| 2003/0191971 | A1 * | 10/2003 | Klensin et al. | 713/201 |
| 2004/0049693 | A1 * | 3/2004 | Douglas | 713/200 |
| 2004/0236547 | A1 * | 11/2004 | Rappaport et al. | 703/2 |
| 2006/0095331 | A1 * | 5/2006 | O'Malley et al. | 705/22 |
| 2006/0253580 | A1 * | 11/2006 | Dixon et al. | 709/225 |
| 2007/0094042 | A1 * | 4/2007 | Ramer et al. | 705/1 |
| 2007/0192859 | A1 * | 8/2007 | Shahar et al. | 726/22 |
| 2007/0198635 | A1 * | 8/2007 | Lindner et al. | 709/203 |
| 2007/0260729 | A1 * | 11/2007 | Dweck | 709/224 |
| 2007/0265992 | A1 * | 11/2007 | Heidenreich et al. | 706/45 |
| 2007/0294339 | A1 * | 12/2007 | Ala-Kleemola et al. | 709/203 |
| 2008/0168531 | A1 * | 7/2008 | Gavin | 726/1 |
| 2008/0177994 | A1 * | 7/2008 | Mayer | 713/2 |
| 2008/0181404 | A1 * | 7/2008 | Matsuki et al. | 380/259 |
| 2008/0201640 | A1 * | 8/2008 | Stuckman et al. | 715/716 |
| 2009/0216760 | A1 * | 8/2009 | Bennett | 707/5 |
| 2010/0010890 | A1 * | 1/2010 | Ditkovski et al. | 705/14.41 |
| 2010/0081509 | A1 * | 4/2010 | Burke et al. | 463/42 |
| 2010/0082376 | A1 * | 4/2010 | Levitt | 705/7 |
| 2010/0131441 | A1 * | 5/2010 | Gruenhagen et al. | 706/45 |
| 2010/0241510 | A1 * | 9/2010 | Zhang | 705/14.45 |

* cited by examiner

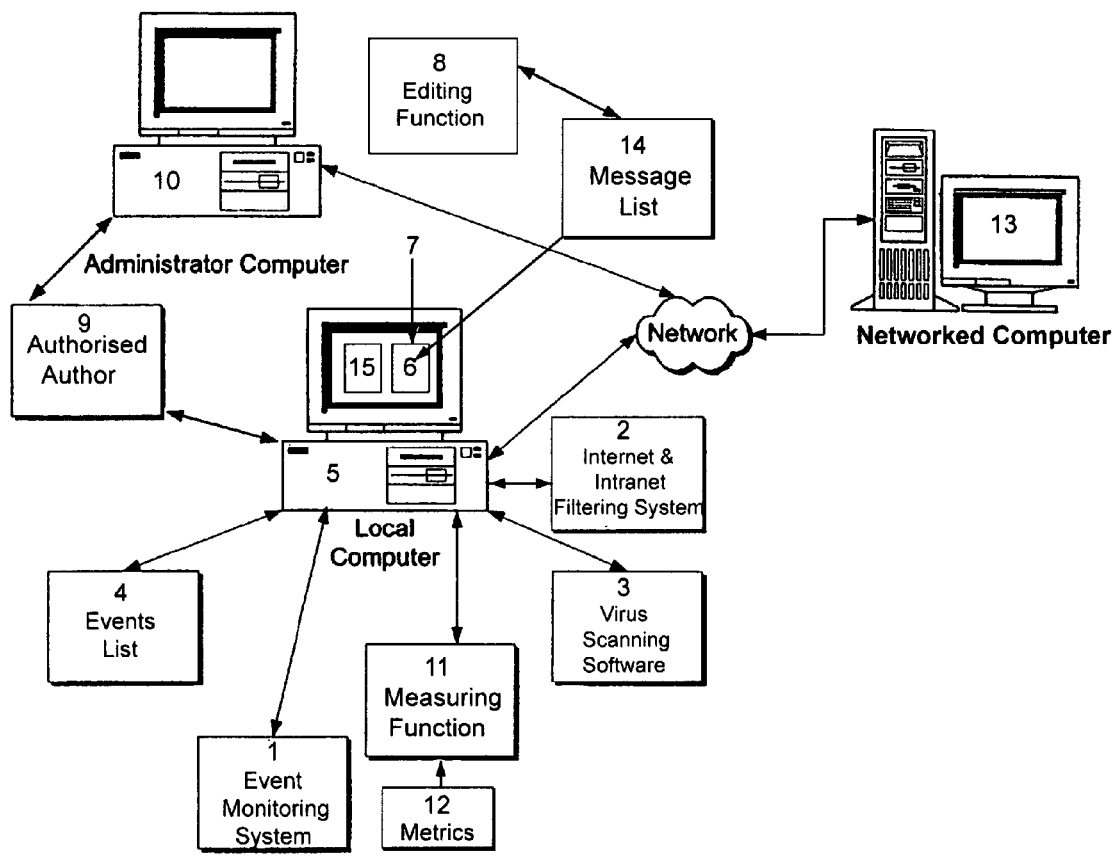

SYSTEM AND METHOD FOR ADAPTING AN INTERNET AND INTRANET FILTERING SYSTEM

FIELD OF THE INVENTION

The present invention relates to a system and method for improved value utilisation and communication of Internet or Intranet page content using an Internet or Intranet browser or user interface with a domain name entry, Uniform Resource Locator (URL) and Internet or Intranet page content filtering system or other event monitoring system. In particular, the invention takes advantage of the interface to a content filtering system or other event monitoring system that filters prohibited domain name entries, URLs and Internet or Intranet page content or other events and diverts a user when they have deliberately or inadvertently caused an Internet or Intranet browser or other security threat or breach to provide an improved viewing and reading experience for the user and a more effective, targeted and measurable delivery of communication for authorised authors.

BACKGROUND TO THE INVENTION

The Internet is a global system of computers that are linked together so that the various computers can communicate seamlessly with one another. Internet users access server computers to download and display informational or hypertext pages typically through an Internet browser. Once a server has been connected to the Internet, informational or hypertext pages can be displayed to virtually anyone having access to the Internet. Alternatively, an Intranet is a private computer network that uses the protocols of the Internet but host informational or hypertext pages that can only be seen by a select number of network connected computers using an Intranet browser and hence a limited number of users.

Currently, documents available on the Internet are usually represented in the format of "hypertext." Each hypertext "page" can be arbitrarily long, and may or may not fit within one computer monitor screen. Pages of hypertext maybe linked to each other by "hyperlinks" on each page of a hypertext, and there might be one or more "links" in the form of static or animated pictures, video, words or embedded documents which, when selected and clicked on (with, say, an input device such as a computer mouse) will cause the hypertext document to which the hyperlink is linked to appear on the computer monitor screen. In other words, the text of the new page replaces the earlier hypertext page.

Domain name entry, Uniform Resource Locator (URL) and Internet or Intranet page content filtering systems interfaced with Internet or Intranet browsers are used to provide security and reduce threats such as prohibited domain names or URLs, undesirable emails, pop-ups, downloads and prohibited Internet or Intranet page content that may be categorised by the amount and type of language, nudity, sex or violence contained within a page. Other event monitoring systems that also detect undesirable or prohibited activities such as virus scanning software may be installed on a computer to provide additional security and reduce threats such as computer viruses, malware, spam, and phishing.

Typically content filtering systems or other 'watch dog' monitoring systems such as virus scanning software installed on a computer are event based, so when their predefined criteria or rules for detecting a potential security threat or breach are met, they are triggered to perform a series of procedures so as to protect a computer, network or user. For example, if a prohibited domain name, URL or prohibited Internet or Intranet page content is searched, selected or requested using a browser or hyperlink, then typically a filtering system would trigger a procedure that stops the request from linking to the prohibited domain name, URL or prohibited Internet or Intranet page content and hence stop the Internet or Intranet browser from displaying the prohibited domain name, URL or Internet or Intranet page content and instead display an Internet or Intranet page with a static default standard hypertext security message within the browser for the user to view and read detailing that a potential threat had been detected and thwarted, for example a security message may say "Access Denied". This standard security notification message typically remains displayed until the user decides to visit another domain name, URL, hyperlink to another Internet or Intranet page or close the browser. Once all triggered procedures are completed and the computer or network is no longer under security threat or breach, these filtering systems or other event monitoring systems such as virus scanning software continue to operate in the background of a computer and or network waiting to detect the next security threat or breach. (The term "and or" herein means "and/or").

While the current function of Internet or Intranet browser filtering systems or other event monitoring systems such as virus scanning software affords users protection from threats, their static standard security notification message displayed on a hypertext page through a browser typically only detail in a few words that security has been breached and little else, which under-utilises the opportunity and potential to provide and communicate value-adding information back to the user at a point in time when they have deliberately or inadvertently caused an Internet or Intranet browser security threat or breach. The default standard hypertext security message provides basic and minimal information, and hence minimal usefulness and experience for the user. Further, conventional filtering systems or other event monitoring systems such as virus scanning software do not provide a function to enable authorised authors to edit in a live environment the typical default standard hypertext security message to communicate more effective and targeted value-adding information to the browser user that may be classified as useful, entertaining, educational, interesting or instructional at a unique point in time. Typically, once a filtering system or other event monitoring system such as virus scanning software displays its default standard hypertext security message within a browser or user interface it has completed its procedure and provides no further use or value to a user.

It is an object of this invention to overcome or substantially ameliorate the disadvantages of the prior art by providing a system and method that interfaces with a domain name, URL, Internet or Intranet page content filtering system and or other event monitoring systems such as virus scanning software which requires secure login by authorised authors at all times and enables users to edit and publish a hypertext security message/s in a live environment to communicate more effective, targeted and measurable information that may be classified as useful, entertaining, educational, interesting or instructional to a user through a browser or user interface at a point in time when they have deliberately or inadvertently caused a Internet or Intranet browser security threat or breach or when their computer's virus scanning software has detected a security threat to provide them an improved viewing and reading experience.

SUMMARY OF INVENTION

The system and method has several features, no single one of which is solely responsible for its desirable attributes.

Without limiting the scope as expressed by what follows, its more prominent features will now be discussed briefly. After considering this discussion, and particularly after reading the section entitled "Detailed Description of the Invention" one will understand how the features of the system and method provide several advantages over conventional filtering systems and other event monitoring systems such as virus scanning software.

The present invention addresses the limitations in the conventional Internet or Intranet browser with a domain name entry, Uniform Resource Locator (URL) and Internet or Intranet page content filtering system and or other event monitoring systems such as virus scanning software by providing an interface system and method that enables authorised authors to communicate targeted and value-adding information to the user through a browser or user interface at the unique point in time when they have deliberately or inadvertently caused an Internet or Intranet browser security threat or breach or when their computer's virus scanning software has detected a security threat or breach, and improves utilisation of Internet or Intranet page content at this point in time which may be measured for its effectiveness as communicated information. Advantageously, this invention allows the communication of value-adding information to also be displayed to a user in the event that their computer has timed-out as an alternative to a standard computer monitor screen-saver.

The invention is installed on a standalone or networked computer and may comprise an events list which is either a local or centrally stored file on the computer that may contain a listing of possible non-threats such as a computer timing out, security threats such as computer viruses, malware and spam and or Internet or Intranet page identifiers, which typically are Uniform Resource Locators (URLs) and a content category related to allow-block lists used in a filtering system and the content category for each such Internet or Intranet page. A content settings function is further provided containing settings for the user as determined by the computer administrator. Such content settings may include an age group map that cross-references age groups to the categories of landing page permissibly and suggestibly viewable by the respective age group or their personal interests. Content settings may also include the user's interest-matching list, the user's age group and other demographic based grouping as determined and customised by the administrator. Preferably authorised authors may access the events list and content settings by unique and secure password to classify and compile a plurality of different types of non-threatening and security threatening events that may occur within a computer, an Internet or Intranet filtering system or other area of a computer, for example a detectable threat or breach found by an installed virus scanning software, or a non-threatening event such as when a computer has timed-out, or a prohibited content is requested and is programmed to automatically display a standard notification or computer monitor screen-saver.

Preferably the invention continually interfaces with a plurality of computer based event monitoring systems such as filtering systems and or virus scanning software to determine whether these systems have detected a non-threatening event and or security threat or breach that corresponds with those detailed within the events list and content settings. Preferably when an event such as a security threat has been detected by an event monitoring system such as a filtering systems and or virus scanning software that corresponds to an event recorded on the events list, a corresponding tailored and targeted hypertext message and information is instantly displayed to the computer user through a browser or user interface by the invention.

Preferably an editing function shall be provided that enables the login of authorised authors including computer administrator/s by unique and secure password to edit and publish tailored and targeted hypertext messages and information that may be classified as useful, entertaining, educational, interesting or instructional to a computer user through a browser or user interface in the instant their computer's event monitoring systems detect an event corresponding to that recorded on the events list.

Preferably a measuring function shall be provided that enables the login of authorised authors including computer administrator/s by unique and secure password to define and set up a plurality of metrics that may enable them to measure the effectiveness of the published and communicated messages and information recorded within the editing function in terms of being useful, entertaining, educational, interesting or instructional to a computer user.

Additional advantages and the novel features of the invention will be set forth in the description which follows, and in part will be apparent to those skilled in the art upon examination of the following, or may be learned by practice of the invention.

BRIEF DESCRIPTION OF DRAWINGS

The present invention is described in detail below with reference to the attached drawing FIGURE, wherein:

FIG. 1 is an illustration detailing an overview of the present invention.

DETAILED DESCRIPTION OF THE INVENTION

The invention provides a system and method for continuously interfacing with a plurality of computer based event monitoring systems 1 such as Internet and Intranet filtering systems 2 and or virus scanning software 3 to determine whether these systems have detected a non-threatening and or security threatening event that corresponds with an event pre-determined and recorded within the events list 4 which contains a plurality of non-threatening and security threatening events that may occur within a computer 5 which in turn triggers a classified, targeted and value-adding hypertext message or information 6 to be instantly displayed to the computer user through a browser or user interface 7 instead of an event monitoring system 1 default hypertext security message, and preferably an editing function 8 shall be provided that enables the login of authorised authors 9 including computer administrator/s 10 to edit and publish targeted and value-adding hypertext messages and information 6, and preferably a measuring function 11 shall be provided that enables the login of authorised authors 9 including computer administrator/s 10 to define and set up a plurality of metrics 12 that may enable them to measure the effectiveness of the displayed targeted and value-adding hypertext messages and information 6 in terms of being useful, entertaining, educational, interesting or instructional to a computer user through a browser or user interface 7 at the unique point in time when their computer has detected an event.

The invention is preferably installed on a standalone 5 or networked computer 13, with an events list 4, hypertext message list 14. Moreover, those skilled in the art will appreciate that the invention may be practised with other computer system configurations, including hand-held devices.

The events list 4 is preferably a listing of a plurality of non-threatening and security threatening events that may occur and be detected by computer base monitoring systems 1 such as Internet and Intranet filtering systems 2 and or virus scanning software 3 within a computer which is preferably accessible by unique and secure password to enable the login of authorised authors 9 including computer administrator/s 10 to edit and group these events by type such that hypertext messages and information 6 recorded on the hypertext message list 14 can be subsequently classified and subsequently displayed in the instant a particular event occurs. The present embodiment may operate with a pre-populated events list 4 to provide an authorised author 9 or administrator/s 10 a listing of typical events to choose from to save time.

Preferably this system and method continuously interfaces and communicates with a predetermined group of computer based event monitoring systems 1 such as Internet and Intranet filtering systems 2, virus scanning software 3 and standard computer alerts until it determines that a system/s or alert has detected a non-threatening and or security threatening event that corresponds with a pre-determined event recorded within the events list 4. On installation of the system and method the installer shall be provided the option to search, select and pre-determine which computer based event monitoring systems 1 are to be continuously interfaced with. Preferably this system and method interfaces directly with that function of an event monitoring system 1 that stops or produces an event which subsequently displays a related default hypertext message, such as "Access Denied" or similar, and replaces this default message with a classified hypertext messages or information 6 from the hypertext message list 14 which is instead displayed to the user through a browser or user interface 7.

Preferably the system and method shall be provided an editing function 8 accessible by unique and secure password to enable the login of authorised authors 9 including computer administrator/s 10 to edit in a live environment hypertext messages and information 6 that may be defined as useful, entertaining, educational, interesting or instructional to a user through a browser or user interface 7, and classify such messages and information 6 according to a plurality of pre-defined events and or content categories maintained on the events list 4 such that the hypertext messages and information 6 is targeted and displayed to the computer user through a browser or user interface 7 in the instant their computer's event monitoring systems 1 detect an event corresponding to that recorded on the events list 4, and maintain these hypertext messages and information 6 on the hypertext message list 14. For example, the age group for a primary school and the school's prohibited content categories may include pornography and gambling so that when a primary school child user attempts to access Internet or Intranet pages that may contain these prohibited categories the computer's filtering system's 2 detects the security threat and instead of this filtering system simultaneously displaying its standard default hypertext message of "Access Denied" or similar the invention by referencing the pre-determined events and content categories recorded within the events list 4 determines what type of event has occurred and selects a corresponding value-adding hypertext message 6 that may be entertaining, educational, interesting or instructional and displays this to the child user through a browser or user interface 7 to provide them an improved viewing and reading experience.

Preferably the system and method shall be provided a measuring function 11 which enables the login of authors 9 and computer administrator 10 who are authorised by unique and secure password to define and set up a plurality of metrics 12 that may enable them to measure the effectiveness of their displayed and communicated tailored, targeted and value-adding hypertext message and information 6 in achieving a desired level of effectiveness in terms of being useful, entertaining, educational, interesting or instructional to a computer user in the instant their computer's event monitoring system/s 1 detect an event corresponding to that recorded on the events list 4. A metric may be a static and or dynamic statistic that is set up, calculated via an algorithm and recorded within the measuring function 11 with the measured results collected and saved within the measuring function 11 every time a targeted and value-adding hypertext message and information 6 is displayed to a computer user, which may preferably be presented in a report 15 format within the measuring function 11 or extracted out of the measuring function 11 into another format to enable the authorised author 9 or administrator 10 to easily assess whether their hypertext message and information 6 has been viewed and or interacted with by the computer user the way they intended. For example, an author 9 of a targeted hypertext message 6 may be interested to measure whether a computer user is interacting with this message's hyperlinks and or in measuring how long in time the user stays interacting within the displayed message 6 and or may survey users online on a number of specific questions to gauge their opinion on a particular subject/s. If the measured metric indicates that a displayed hypertext message or information 6 was effective in interacting with a computer user in the way they intended, then the authorised author 9 or administrator 10 may leave this information unchanged, or if the report 15 for a metric 12 indicates that a displayed hypertext message or information 6 was ineffective, then the authorised author 9 or administrator 10 may modify or delete the targeted hypertext information 6.

Although many other internal components of the computer are not detailed, those of ordinary skill in the art will appreciate that such components and the interconnection are well known. Accordingly, additional details concerning the internal construction of the computer need not be disclosed in connection with the present invention.

Finally, it is to be understood that the inventive concept in any of its aspects can be incorporated in many different constructions so that the generality of the preceding description is not to be superseded by the particularity of the attached drawing/s. Various alterations, modifications and/or additions may be incorporated into the various constructions and arrangements of parts without departing from the spirit or ambit of the invention.

The claims defining the invention are as follows:

1. A method for providing content to a user of a computer system, and measuring the effectiveness of said content, comprising:

an event list comprised of predetermined non-threatening and security threatening events, said events comprising a prohibited domain name, prohibited uniform resource locator (URL), prohibited Internet page content and/or prohibited Intranet page content;

wherein said events are at least partially provided from a first plurality of computer based event monitoring systems, comprising domain name entry, URL and Internet and/or Intranet page content filtering systems;

a second plurality of computer based event monitoring systems, comprising domain name entry, URL and Internet and/or Intranet page content filtering systems;

editing and recording of hypertext messages and information for display;

classifying said hypertext messages and information;

detecting and classifying non-threatening or threatening events on said events list;

displaying said classified hypertext messages and information by event type;

wherein, upon a non-threatening or security threatening event being detected within said computer system by said second plurality of computer based event monitoring systems and upon said non-threatening or security threatening event being listed upon said events list, a hypertext message or information is provided to said user, through a browser or interface; and a plurality of metrics are collected to determine the effectiveness of said hypertext message or information to said user.

2. A method as in claim 1 wherein said events are chosen from a group consisting of computer time out events, security threats (comprised of malware, viruses or spam).

3. A method as in claim 1 wherein said first and second plurality of computer based event monitoring systems are chosen from a group consisting of Internet filtering systems, Intranet filtering systems, and virus scanning programs.

4. A method as in claim 1 further providing a content settings function for containing settings for the user as determined by a computer administrator.

5. A method as in claim 4 wherein said content settings function comprises an age group map, a user interest-matching list, an age group of the user, and/or other desired demographic based grouping as determined by said administrator.

6. A method as in claim 1 further comprising searching, selecting and determining said second plurality of computer based event monitoring systems.

7. A method as in claim 5 further comprising accessing installed programs of a computer and identification of the installed programs.

8. A method as in claim 1 wherein said editing and recording of hypertext messages and information further comprises editing and recording of hypertext messages within a message list.

9. A method as in claim 1 in continuous operation.

10. A method as in claim 1 wherein said plurality of metrics are collected and recorded to determine the effectiveness of said message or information to said user.

11. A method as in claim 1 wherein said second plurality of computer based event monitoring systems is chosen upon installation.

12. The method as in claim 1, wherein said classifying hypertext messages and information further comprises referring to non-threatening or threatening events and content categories on said events list.

13. The method as in claim 1, wherein said displaying said classified hypertext messages and information further comprises displaying said classified hypertext messages via an alternate Internet or Intranet browser or user interface.

\* \* \* \* \*